UNITED STATES PATENT OFFICE.

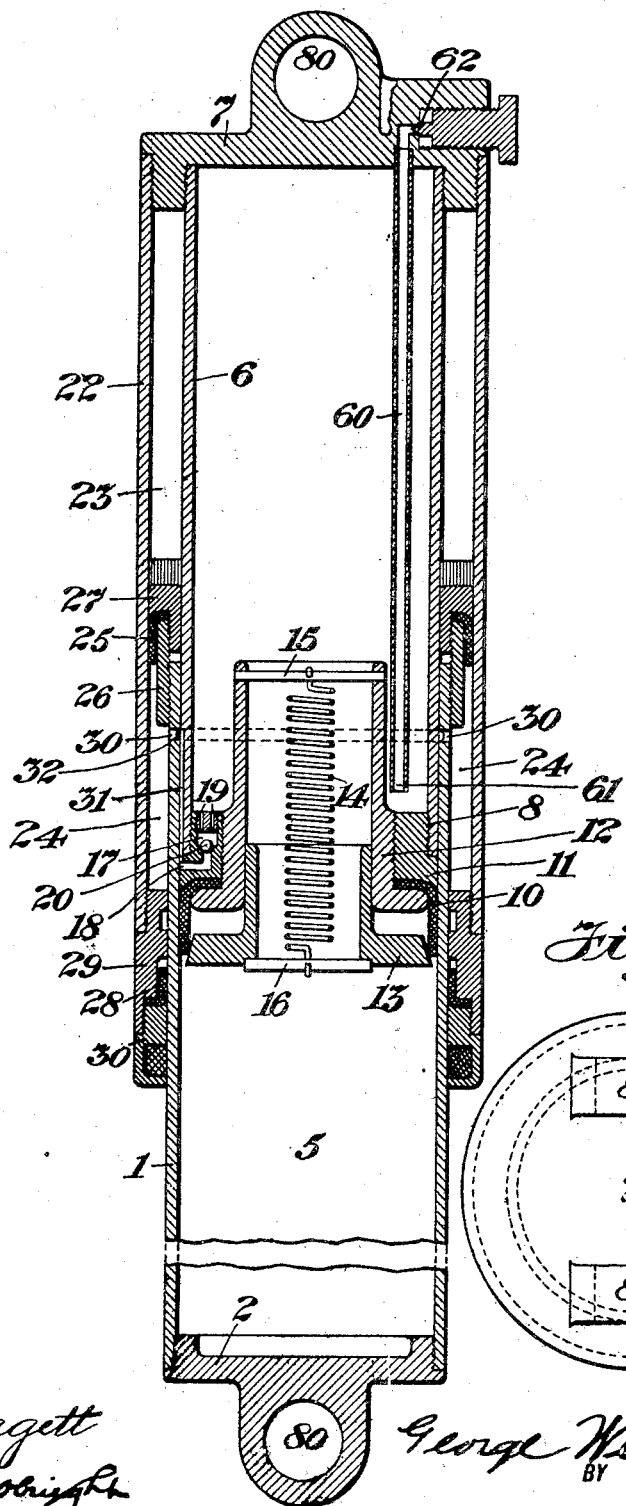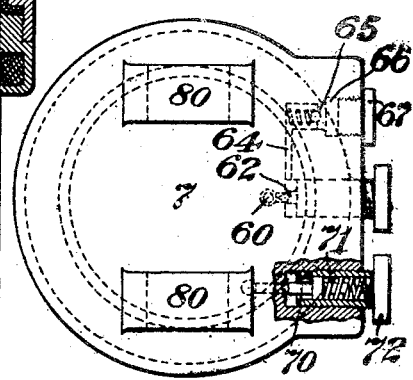

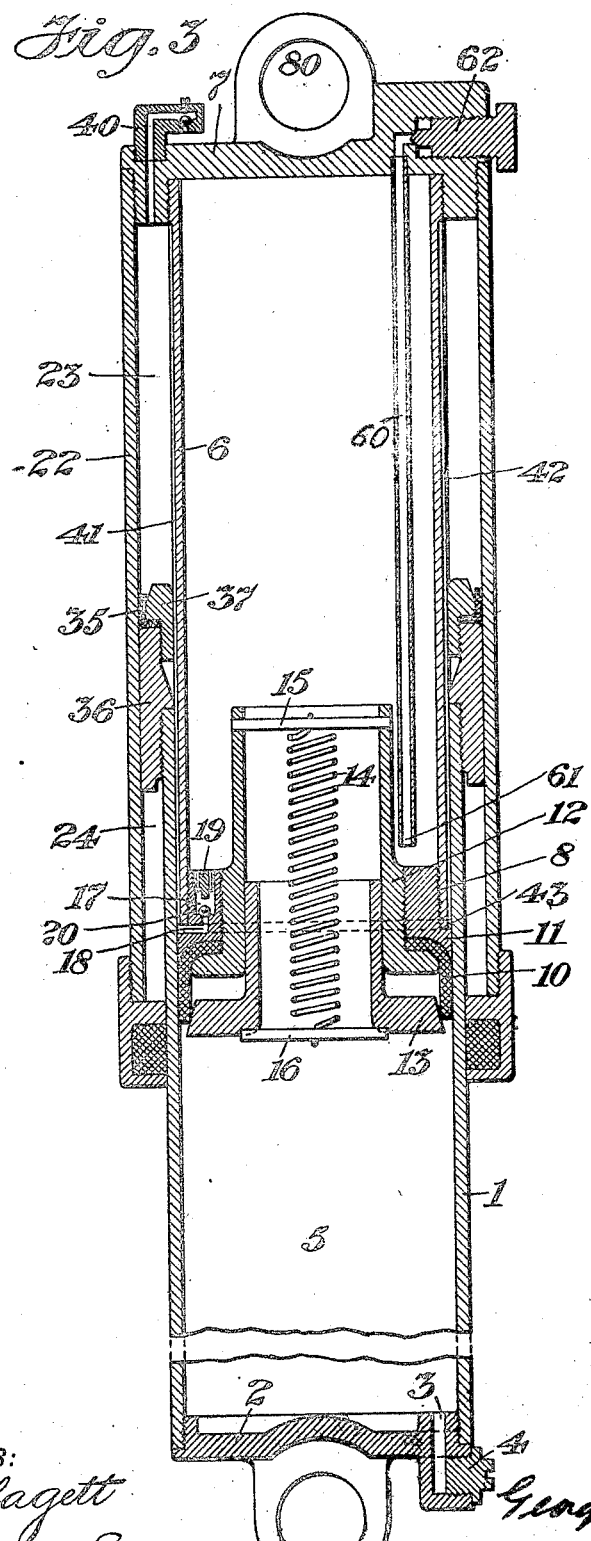

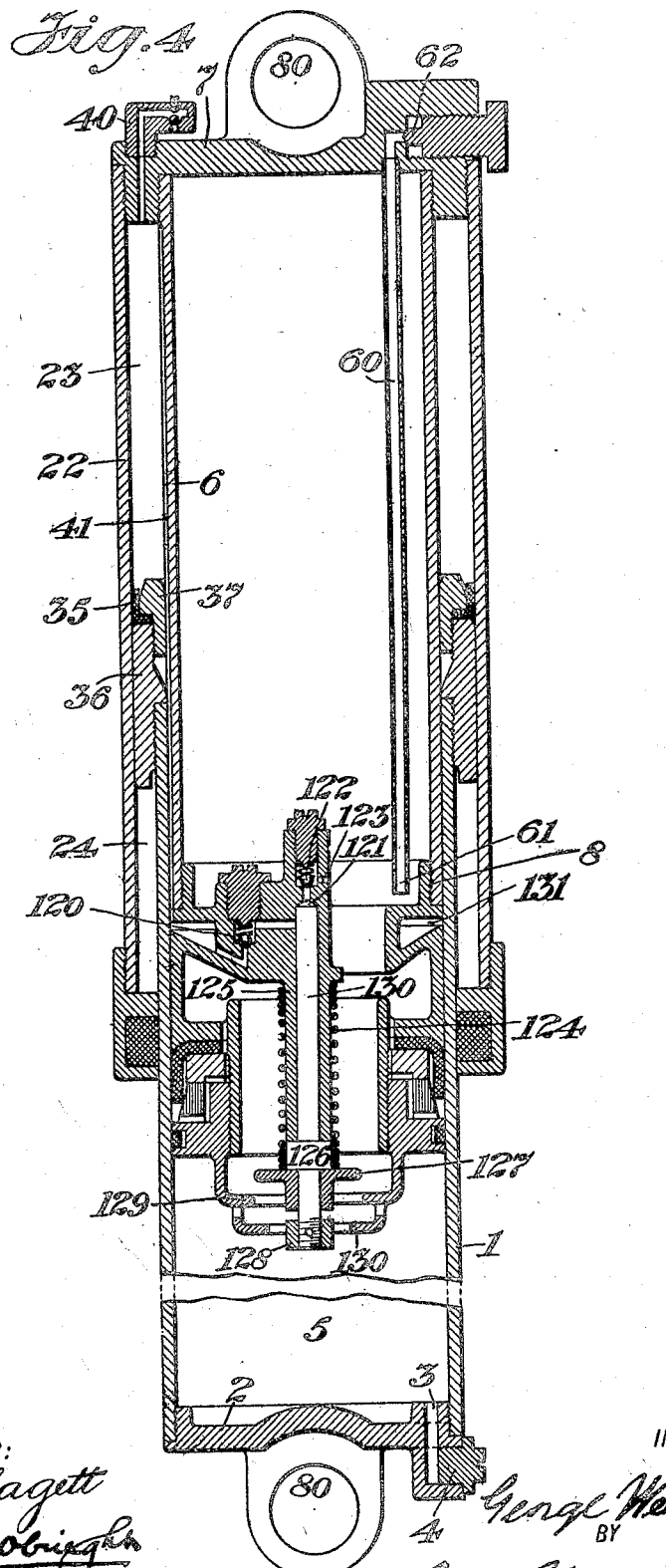

GEORGE WESTINGHOUSE, OF PITTSBURGH, PENNSYLVANIA, ASSIGNOR TO THE WESTINGHOUSE AIR SPRING COMPANY, A CORPORATION OF PENNSYLVANIA.

FLUID-PRESSURE DEVICE.

1,104,945.

Specification of Letters Patent.

Patented July 28, 1914.

Application filed February 25, 1910, Serial No. 545,854. Renewed November 26, 1912. Serial No. 733,706.

*To all whom it may concern:*

Be it known that I, GEORGE WESTINGHOUSE, a citizen of the United States, and resident of Pittsburgh, in the county of Allegheny and State of Pennsylvania, have invented certain new and useful Improvements in Fluid-Pressure Devices, of which the following is a specification.

My present invention relates to certain improvements in the devices set forth in my prior application Serial Number 520,039 filed September 29, 1909. It resembles said prior invention insomuch as it is embodied in a fluid compression cylinder particularly adapted for use as a compression spring, which may be used in any relation where two bodies are so associated that resilient movement is desirable, and especially where one or the other of the bodies is subject to sudden movements, vibrations, or shocks which it is undesirable to have transmitted to the other of said bodies. Certain features relating to the packing and lubrication of the sliding joint of the cylinder are applicable in any relations where high pressures are to be sustained.

It will be understood that though capable of use in other relations, the invention has been devised primarily in connection with automobiles, and the general object in view has been to embody the principles of resilient support by an elastic compression medium, such as air or gas in a practical, self-contained, gas-tight compression device adapted to serve all the purposes of the steel springs commonly used, and to combine therewith all the desirable features of a shock absorber, the entire device being adapted to meet the exacting conditions and to stand the rough usage required in connection with automobiles, delivery wagons, trucks, railway rolling stock, etc.

I prefer to make the compression members in the form of telescoping tubes with the smaller or inner tube uppermost. The tubes are hermetically closed at the outer ends and the inner tube is provided at the inner end with peripheral packing adapted to form a fluid tight joint, and is internally contracted to form a relatively constricted passage, so that the flow of liquid to and fro between the fixed volume compression space in the upper cylinder and the variable space in the lower cylinder, is more or less throttled. The fluid within the cylinder consists of a compressible medium such as air or other gas in the upper portion, and an incompressible medium, such as oil, glycerin, etc., filling the lower portion, preferably to a level above the packing. The throttling effect at the lower end of the plunger cylinder may be rendered asymmetric by means of a check valve adapted to remain normally open on the compression movement of the spring, but to cut off a desired portion of the passage upon the expansion movement. By locating the valve below the normal level of the fluid, all of the fluid which passes to and from the fixed volume compression space may be subject to the asymmetric throttling action of the valve. The normal internal pressure of the fluid medium is preferably high, but for convenience in practical operation of an automobile, is preferably not higher than can be supplied by an efficient tire pump of the ordinary commercial type.

In my prior application referred to I have shown a pump adapted to remove fluid from the low pressure side of the packing for the sliding joint between the cylinder and plunger, and to force the fluid into the pressure cavity within the cylinder. The pump referred to is located inside of the cylinder and may be arranged so as to apply a certain degree of suction between the sliding surfaces of the two cylinders and this may serve in certain cases to pump air into the cylinder as well as to collect escaping oil. In cases where the pump is of a capacity adapted to produce increase of internal pressure, I may provide an adjustable relief valve adapted to permit escape of air when the internal pressure exceeds the desired value. It will be noted that such internal pump operates to cause movement of the fluid by applying suction from the inside and whereas equivalent results may be produced by applying pressure from the outside and my present invention includes means for externally applying such pressure for such purposes. The external pump which I preferably use for this purpose may be used in combination with an internal pump of the kind described in my prior application so that the movement of fluid from the joint is assisted both by raising the outside pressure and reducing the inside pressure so that both suction and forcing co-operate to produce efficient operation of the device.

In my present external pump for increasing the external pressure on the low pressure side of the sliding joint I prefer to utilize the compression and plunger cylinders as elements of the pump, an exterior cylinder being rigidly secured to the plunger cylinder so as to form an annular compression space in which the wall of the compression cylinder operates as an annular piston. When this external pump is used in connection with an internal pump the latter may be operated positively as set forth in the application of Richard Liebau, Serial No. 545957 of even date herewith or it may be operated by flow of the fluid from the variable volume space to the fixed volume space within the device as set forth in my prior application above referred to.

In the drawings Figure 1 is a vertical, axial section through a cylinder containing my invention. Fig. 2 is a top plan view of the same. Fig. 3 is a view similar to Fig. 1 showing a modified form of outside pump. Fig. 4 is a similar view showing the outside pump of Fig. 3 used in connection with an inside pump such as shown in my prior application above referred to.

The lower cylinder 1 is hermetically closed at the bottom by a screw head 2 and, as shown in Figs. 3 and 4, this head may be formed with a discharge passage 3 which is normally closed by screw plug 4. The cylinder 1 provides the variable space 5 which is adapted to be increased or decreased by up or down movements of the plunger cylinder 6. The latter is provided on the upper end with a hermetic screw closure 7. As shown in the drawings, the lower end is screw threaded at 8 to a plunger head provided with an external packing and an internally constricted fluid passage. The packing consists of a cup leather 10 clamped against seat 11, by means of a flanged annular ring 12. The free edge of the cup leather is preferably cut square and is held in close engagement with the inner walls of the cylinder by means of a cone 13 which is guided by and is longitudinally slidable in 12. The cone is yieldingly held by the axial spring 14 secured to cross-bars 15 and 16 which engage 12 and 13 respectively. The plunger is provided with a passage 17 having an intake 18 in the sliding joint on the low pressure side of the packing and an outlet 19 into the device so that when pressure is applied from the outside pump, fluid may be forced into the compression device during periods of high external pressure while reverse flow at other times is prevented by the check valve 20.

The relative movements of the compression cylinder and plunger cylinder are utilized to produce the pressure required to force fluid through the valve 20. In the preferred construction I arrange an outer or guard cylinder 22 rigidly connected with plunger cylinder 6 and spaced apart therefrom so as to form annular compression spaces 23, 24, the upper end of the compression cylinder being utilized as an annular piston for compressing the air within either of said spaces. In the form shown in Fig. 1 the lower space 24 is utilized for this purpose whereas in the form shown in Figs. 3 and 4 the upper space 23 is utilized.

In Fig. 1, the piston packing for the upper edge of cylinder 1 is provided by a cup leather 25 clamped between ring 26 screwed to cylinder 1 and ring 27 screwed to ring 26. The other end of the compression space is closed in by cup leather 28 secured between a ring 29 screwed to the lower end of outer cylinder 22 and a clamping ring 30 screwed to said ring 29. Air may be admitted to this space through any desired form of check valve, and while such valve may be separate as indicated at 40 in Figs. 3 and 4, the leather 28 may be utilized for this purpose by making the proportion of parts such that the free edge thereof is held against the outer wall of cylinder 1 mainly by resilience of material of the leather and by internal pressure within the space 24.

When in use the pump will be more efficient in proportion to the extent of the expansion and compression movements of the device. For instance when used as a spring for an automobile, minor vibrations will produce relatively small compression in the space 24 but in case of a violent compression air will be drawn into space 24 through cup leather 28 which will act as a valve to permit entrance of air but to prevent its escape. Space 24 being thus filled, a violent recoil movement of the spring will cause great compression of the air in space 24. The pressure thus produced is applied to the sliding joint through passages 30, 30, provided for this purpose and if desired a groove 31 may be provided in the surface of the plunger cylinder 6 so that passages 30 may discharge thereinto thereby applying the pressure to the inlet 18. As it would be difficult in practice to make the groove 31 to coincide accurately with passages 30 I prefer to arrange an annular groove 32 about the inside of cylinder 1 at the level of said inlet passage 30 so that the groove 31 will come into communication with the pressure in space 24 whenever the expansion movement is sufficient to bring the upper end of the groove 31 up to the level of 30. Such groove will also serve to a certain extent as a collector for surplus oil which will be cleared therefrom and driven into groove 31 by the compressed air. It will be understood that a collecting groove may be also formed in the plunger on the level of inlet 18 and there may be a number of grooves 31.

The arrangements for charging the device with oil and compressed air are preferably located in head 7 of cylinder 6. As shown in Fig. 1, an inlet tube 60 extends down a desired distance, so that its outlet orifice 61 is at or about the desired level of the liquid to be used. The passage of air or liquid through this tube is controlled by a needle valve indicated at 62. As indicated in Fig. 2, there is a passage 64 leading from the needle valve chamber to an inlet check valve 65, which communicates with a screw threaded opening 66, to which may be connected supply pipes for oil or compressed air. In charging the device oil may be introduced by loosening needle valve 62 and supplying oil through opening 66 and check valve 65. After oil has been charged into the device to or above the level of the orifice 61 of pipe 60, the compressed air is introduced through 66, 65, 64, 60, until the internal pressure is sufficient to support the desired load with the parts approximately in the position indicated in Fig. 1. The air supply is then detached and surplus oil blown out through the pipe 60. The plug valve 62 and the plug 67 are then screwed tight and the device is in condition for use. Undue raise of pressure may be prevented by an automatic relief valve, which is diagrammatically indicated in Fig. 2 as comprising a plug valve 70, closing spring 71, and screw adjusting means 72 for adjusting the initial pressure of the spring to thereby predetermine the maximum internal pressure in the device. The liquid used is preferably pure, free flowing, mineral oil, and it may be mixed with pure, perfectly pulverized graphite.

The above described device is provided at both ends with journals 80, 80, adapted to engage pivots of a universal joint comprising pivots arranged at right angles to each other and a coöperating bracket attached to one of the members to be cushioned by said device.

As stated above the space 23 may also be utilized for compression purposes and arrangements suitable for this purpose are shown in Figs. 3 and 4 in which the packing for the piston consists of a cup leather 35 bearing against the outer cylinder 22 and clamped between a screw ring 36, screwed on to the upper end of cylinder 1 and a clamping ring 37 screwed to ring 36.

An inlet check valve conventionally indicated at 40 is arranged on the cylinder head 7. With this arrangement expansive movements of the spring serve to draw in air through the check valve, while return movement compresses it, and when the movement is sufficient to produce a sufficient compression the air escapes downward through the joint between the piston head 36 and the adjacent wall of cylinder 1. This raises the pressure on the rear side of the sliding joint thereby tending to force oil or air or both upward through the valve 20. As the fit of the sliding joint is usually very perfect I prefer to provide the outer surface of cylinder 6 with one or more vertical grooves 41, 42, communicating with a circumferential groove 43 arranged at the level of the intake 18.

In normal operation of the device when used for instance as a spring support on an automobile, the pump piston being a part of the lower cylinder, the pumping movements will be greater and more efficient according as the device as a whole is subject to greater compression and expansion. For instance, when the automobiles passes over a sufficiently high obstruction at sufficient speed the relative movement will carry the pump piston through the extreme range of the expelling stroke and the air in space 23 will be enormously compressed thereby driving oil or air through grooves 41, 42, inlet 18, valve 20 and through the discharge 19 into the interior of the device. Lesser movements of the spring will be proportionately less efficient and some of them will be insufficient to produce sufficient pressure to operate the valve against the greater internal pressure. It will be found, however, that the great power and long stroke of the pump render it so efficient that a satisfactory amount of pumping operation may be produced even where the extreme movements occur only at considerable intervals.

The above described form of external pump for applying pressure to the joint in the rear of the packing is particularly useful when combined with any of the internal pumps set forth in the applications hereinbefore referred to. A particular instance of this is shown in Fig. 4 wherein all the parts of the external pump are exactly as in Fig. 3, while the plunger, collecting groove packing and internal pump are substantially the same as in my prior application Serial No. 520,039.

Both pumps compress on the compression stroke of the device as a whole but the external pump has a stroke determined by the extent of the compression and expansion of the device while the internal pump has a relatively short stroke dependent on the violence of flow of the fluid to and fro between the variable and fixed volume compression spaces. The significant relation of the two pumps is that the external pump supplies compressed air to the annular collecting groove and inlet valve of the internal pump so that the latter may be assisted by the external pressure. The relation is similar where my external pump is used with any other form of internal pump such for instance as is shown in various applications filed by me or by Richard Liebau.

As before stated the internal pump shown in Fig. 4 forms the subject of my prior application and is claimed herein only in combination with the external pump. It is nevertheless desirable to briefly describe its operation.

The annular groove 131 corresponds to the groove 31 of Fig. 1 while valve 120 corresponds to the valve 20 of Fig. 1 but the outlet from valve 120 leads to the pump cavity 121 and thence through valve 122 and outlet 123 to the interior of the device.

The pump plunger 130 is arranged to perform a considerable part of its stroke before the inlet is uncovered thereby forming a vacuum to be supplied by fluid passing through valve 120. The pump piston is normally held in the elevated position by means of spring 124 secured to the outside of the casting at 125 and to the collar 126 which latter is preferably formed integral with the pump stem. The movements of the pump stem are forced by means of the disk valve 127 arranged in the path of the flow of fluid from the variable space 5 into the fixed volume space in the upper cylinder. This disk is loosely mounted on the piston stem so as to play freely between the annular enlargement 126 and the check nut 128. In operation expansion of the device causes downward movement of the fluid and disk which carries with it the pump piston. Compression movement of the device causes reverse flow of the fluid forcing the disk in the opposite direction thereby forcing the plunger to the end of the expelling stroke. The power of the movements of disk 127 in response to fluid flow may be increased by arranging a construction 129 midway of the path of movement. It will be noted that the resistance offered to upward flow of fluid when the parts are in the position shown in Fig. 4 is relatively small whereas downward flow carrying the valve down to and seating it upon 130 very greatly constricts the area available for passage of the liquid. The object of this arrangement is to permit relatively free compression of the spring as a whole and to partially throttle the return movement to prevent the disagreeable recoil which is frequently attendant upon the operation of vehicle springs when not provided with recoil preventing devices.

Various features of my invention are adapted for use in other relations where the conditions and functions to be served are similar, as, for instance, in other devices wherein a sliding joint is required to sustain great pressures without leaking; also they may be used as a supplement to or substitute for and may be supplemented or substituted by features set forth in the application of Richard Liebau, Serial No. 468,762, filed December 22nd, 1908.

While I have herein fully shown and described, and have pointed out in the appended claims certain novel features of construction, arrangement, and operation which characterize my invention, it will be understood by those skilled in the art that various omissions, substitutions, and changes in the forms, proportions, sizes, and details of the device and of its operation, may be made without departing from my invention.

I claim:

1. An elastic compression device, comprising relatively movable members for varying the volume of the elastic fluid contained in said device, in combination with a pump having a cylinder mechanically connected with one of said movable members and a piston mechanically connected with the other of said members and arranged to increase the pressure on the low pressure side of the sliding joint between said members.

2. An elastic compression device, comprising relatively movable members for varying the volume of the elastic fluid contained in said device, in combination with an external pump having a cylinder mechanically connected with one of said movable members and a piston mechanically connected with the other of said members and arranged to increase the pressure within the pressure cavity of said device.

3. An elastic compression device, comprising a cylinder and a plunger adapted for relative movement to vary the volume of the elastic fluid contained in said device, in combination with a pump having a cylinder carried by the plunger and a piston mechanically connected with said cylinder and arranged to increase the pressure within the pressure cavity of said device, upon the proper relative movement of said cylinder and plunger.

4. An elastic compression device, comprising a cylinder and a plunger adapted for relative movement to vary the volume of the elastic fluid contained in said device, in combination with an external pump having a wall formed by a cylinder concentric with and carried by the plunger and a piston carried by the wall of said cylinder, said pump being arranged to increase the pressure within the pressure cavity of said device.

5. An elastic compression device, comprising relatively movable members for varying the volume of the elastic fluid contained in said device, in combination with a pump having a compression cavity carried by one of said movable members and a piston mechanically connected with the other of said members and arranged to discharge fluid at high pressure within the pressure cavity of said device.

6. An elastic compression device, comprising a cylinder and a plunger movable relatively thereto for varying the volume of the elastic fluid contained in said device, in combination with an external pump having a compression cavity carried by said plunger and a piston having a stroke equal to and caused by the relative movements of said plunger and cylinder, said pump being arranged to apply pressure to the sliding joint between said plunger and cylinder; together with an internal pump arranged to apply suction to said sliding joint and to discharge within the pressure cavity of said device, any fluid removed from said joint.

7. An elastic compression device, comprising a cylinder, a plunger movable relative thereto for varying the volume of the elastic fluid contained in said device, said cylinder and plunger being connected by a sliding joint, in combination with means providing a passage from the low pressure side of the sliding joint to a pressure within the device, an inlet valve controlling said passage, and an external pump concentric with said cylinder and arranged to apply pressure to the said passage.

8. An elastic compression device, comprising relatively movable members for varying the volume of the elastic fluid contained in said device, in combination with a pump having a compression cavity carried by one of said movable members and a piston connected with the other of said members so as to have a positive stroke approximately equal to the distance of relative movement of the relatively movable parts of the compression device, said pump being arranged to increase the pressure within the pressure cavity of said device.

9. An elastic compression device, comprising relatively movable members for varying the volume of the elastic fluid contained in said device, in combination with a pump having a cylinder mechanically connected with one of said movable members and a piston connected with the other of said members so as to have a positive stroke approximately equal to the distance of relative movement of the relatively movable parts of the compression device, said pump being arranged to increase the pressure within the pressure cavity of said device.

10. An elastic compression device, comprising a cylinder and a plunger adapted for relative movement to vary the volume of the elastic fluid contained in said device, in combination with an external pump having a cylinder carried by the plunger and a piston connected with said cylinder so as to have a positive stroke approximately equal to the distance of relative movement of the relatively movable parts of the compression device, said pump being arranged to increase the pressure within the pressure cavity of said device.

11. An elastic compression device, comprising a cylinder and a plunger adapted for relative movement to vary the volume of the elastic fluid contained in said device, in combination with an external pump having an annular compression space carried by the plunger and a piston formed upon the upper edge of said cylinder, said pump being arranged to increase the pressure within the pressure cavity of said device.

12. An elastic compression device, comprising relatively movable members for varying the volume of the elastic fluid contained in said device, in combination with a pump having a cylinder rigidly connected with one of said movable members and a piston connected with the other of said members so as to have a positive stroke approximately equal to the distance of relative movement of the relatively movable parts of the compression device, said pump being arranged to remove fluid from the low pressure side of the joint between said parts.

13. An elastic compression device, comprising a cylinder and a plunger adapted for relative movement to vary the volume of the elastic fluid contained in said device, in combination with an external pump having a compression chamber carried by the plunger and a piston connected with said cylinder so as to have a positive stroke approximately equal to the distance of relative movement of the relatively movable parts of the compression device, said pump being arranged to remove fluid from the low pressure side of the joint between the plunger and cylinder.

14. An elastic compression device, comprising relatively movable members for varying the volume of the elastic fluid contained in said device, in combination with an internal pump having a cylinder carried by one of said movable members and a piston operated by flow of fluid within the device, arranged to receive fluid from the low pressure side of the joint between said movable members and to discharge fluid at high pressure within the pressure cavity of said device, together with an external pump arranged to apply pressure to the low pressure side of said joint.

15. An elastic compression device, comprising a cylinder and a plunger movable relatively thereto for varying the volume of the elastic fluid contained in said device, in combination with an internal pump having a cylinder mounted upon said plunger and a piston operated by flow of fluid within the device, said pump being arranged to take in fluid from the low pressure side of the plunger joint and to discharge fluid under high pressure into the pressure cavity within said device; together with an external pump arranged to apply pressure to the intake of said first mentioned pump.

16. An elastic compression device, comprising a cylinder and a plunger movable relatively thereto for varying the volume of the elastic fluid contained in said device, in combination with an internal pump having a cylinder mounted upon said plunger and a piston operated by and in accordance with relative movement of said cylinder and plunger, said pump being arranged to take in fluid from the low pressure side of the plunger joint and to discharge the same so as to increase the pressure within the pressure cavity of said device; together with an external pump concentric with said cylinder and arranged to apply pressure to the intake of said first mentioned pump.

17. An elastic compression device, comprising a compression cylinder and a plunger cylinder adapted for relative movement to vary the volume of the elastic fluid contained in said device, an internal pump having a compression chamber carried by the plunger and a piston operated non-positively by the compression and expansion movements of said cylinder and plunger so as to have a stroke much less than the distance of relative movement of the relatively movable parts of the compression device, said pump being arranged to increase the pressure within the pressure cavity of said device, in combination with an exterior compression pump arranged to increase the pressure at the intake of said internal pump, said pump comprising an exterior cylinder carried by said plunger cylinder and forming therewith an annular compression space for which the wall of said compression cylinder forms an annular piston.

18. An elastic compression device, comprising a compression cylinder and a plunger cylinder adapted for relative movement to vary the volume of the elastic fluid contained in said device an internal pump having a cylinder carried by the plunger, and a piston operated by a valve disk having a loose mechanical connection with the stem of said piston, said pump being arranged to receive fluid from the low pressure side of the sliding joint between said compression and plunger cylinders, in combination with an exterior compression pump arranged to supply pressure at said low pressure side of said sliding joint, said exterior pump comprising an exterior cylinder carried by said plunger cylinder and forming therewith an annular compression space for which the wall of said compression cylinder forms an annular piston.

19. An elastic compression device, comprising a cylinder and a plunger adapted for relative movement to vary the volume of the elastic fluid contained in said device, in combination with an external pump having a cylinder carried by the plunger and a piston mechanically connected with said plunger and arranged to increase the pressure within the pressure cavity of said device.

20. A cushion device comprising a cylinder, a plunger fitted to slide therein to permit variation of the volumetric capacity thereof, a packing for the sliding joint between said cylinder and plunger, a pump for supplying pressure to the sliding joint on the low pressure side of said packing and a second pump for transferring fluid from said sliding joint to the interior of said cylinder.

21. A cushion device comprising relatively movable members forming a chamber and having a sliding joint therebetween to permit variation of the volumetric capacity thereof, in combination with two pumps, one arranged to supply fluid under pressure to said sliding joint, and the other arranged to transfer fluid from said sliding joint to said chamber, and a check valve in the path of flow of the fluid to said latter pump, said check valve being arranged to admit and retain fluid flowing toward said latter pump.

22. A cushion device comprising telescopically arranged cylinders having a packed sliding joint therebetween to permit variation of the volumetric capacity of the chamber formed thereby, in combination with two pumps, one arranged to supply fluid under pressure to the low pressure side of said packed joint, and the other to transfer fluid from the low pressure side of said packed joint into said chamber.

23. A cushion device comprising telescopically arranged cylinders forming a cushion chamber, a packing for the sliding joint therebetween, a guard cylinder and a check valve coöperating with said guard cylinder and one of said telescopically arranged cylinders to form a valved pump for supplying fluid under pressure to said chamber.

24. In an air spring, telescopically-arranged cylinders forming a closed chamber having a sliding joint, a packing for said joint, a guard cylinder surrounding said members and serving as a collecting chamber for the liquid which leaks past said packing, and an inlet passage from said guard cylinder to said closed chamber.

25. In an air spring, telescopically-arranged cylinders forming a closed chamber having a sliding joint, a packing for said joint, a guard cylinder surrounding said members and serving as a collecting chamber for the liquid which leaks past said packing, an inlet passage, and means for transferring leaked liquid from said collecting chamber to said closed chamber.

26. In an air spring, telescopically-arranged cylinders forming a closed chamber having a sliding joint, a packing for said joint, a guard cylinder surrounding said members and serving as a collecting chamber for the liquid which leaks past said packing, an inlet passage, and means operating upon the relative movement of said telescopically-arranged members for transferring leaked liquid from said collecting chamber to said closed chamber.

27. In an air spring, three concentric cylinders one of which is arranged to telescope between the other two forming an interior closed chamber and a collecting chamber for leaked liquid, a passage from said collecting chamber to said closed chamber, and means operating upon the telescopic movement of said cylinders to transfer liquid from said collecting chamber to said interior chamber.

28. A cushioning device comprising telescopically arranged cylindrical members forming a closed chamber, a packing for the joint between said members, a guard cylinder surrounding said members, a packing between said guard cylinder and one of said members, and a valve controlling delivery through a passage communicating with an annular space inclosed by said guard cylinder and the chamber inclosed by said telescoping members.

29. A cushioning device comprising telescopically arranged cylindrical members, forming a closed chamber, a packing for the joint between said members, a guard cylinder surrounding said members, and a valve for controlling delivery through a passage communicating with the chamber inclosed by said members, and an annular chamber formed between said members and said guard cylinder.

30. A cushioning device comprising relatively movable telescopically arranged cylindrical members inclosing a chamber and having a sliding joint therebetween to permit of variations in the volumetric capacity of said chamber, a packing for the joint, a guard cylinder surrounding the overlapping edges of said members, packings located between said guard cylinder and one of said members, and inclosing an annular chamber between the guard cylinder and the member, and a passage around said first mentioned packing and communicating with said annular chamber and the chamber inclosed by said members.

31. A cushioning device comprising relatively movable telescopically arranged cylindrical members having a sliding joint therebetween and inclosing a chamber, a packing for said joint, a guard cylinder surrounding said members, two relatively movable annular packings between said guard cylinder and one of said members, and a valve controlling delivery through a passage communicating with the chamber inclosed by said members and the annular chamber inclosed by said annular packings and said guard cylinder.

32. A cushioning device comprising relatively movable members forming a chamber and having a sliding joint therebetween to permit variations in the volumetric capacity of the chamber, a guard member surrounding said relatively movable members and extending beyond the overlapping edges thereof and forming with said members a second chamber partially surrounding the first mentioned chamber and having a means of communication through said relatively movable members with said first mentioned chamber, and a packing for the joint between said relatively movable members.

33. A cushioning device comprising relatively movable members inclosing a chamber and having a sliding joint therebetween to permit of variations in the volumetric capacity of the chamber, a packing for said sliding joint, a guard member surrounding said relatively movable members and extending beyond their overlapping edges, and a valve controlling delivery through a passage formed in said relatively movable members on the low pressure side of the packing, and establishing communication between the chamber inclosed by said members and the space surrounded by said guard member.

34. A cushioning device comprising telescopically arranged cylindrical members inclosing an interior chamber and having a sliding joint therebetween to permit variations in the volumetric capacity of said chamber, a guard cylinder surrounding said members and overlapping the joint between them and forming an exterior chamber around the members, a check valve for controlling delivery into said interior chamber through a passage formed in said members and communicating with the exterior chamber, and a packing for the sliding joint between said members and for preventing leakage from the interior chamber.

Signed at New York city in the county of New York and State of New York this 24th day of February, A. D. 1910.

GEO. WESTINGHOUSE.

Witnesses:
RICHARD LIEBAU,
IRVING M. OBRIEGHT.